United States Patent [19]

Tsuchikawa et al.

[11] Patent Number: 5,624,535
[45] Date of Patent: Apr. 29, 1997

[54] PRODUCTION SYSTEM OF ELECTROLYZED WATER

[75] Inventors: Koji Tsuchikawa, Nagoya; Naomoto Amano, Okazaki; Yshinori Kamitani, Nagoya; Takeaki Funabashi, Toyoake, all of Japan

[73] Assignee: Hoshizaki Denki Kabushiki Kaisha, Aichi-ken, Japan

[21] Appl. No.: 546,217

[22] Filed: Oct. 20, 1995

[30] Foreign Application Priority Data

Oct. 20, 1994 [JP] Japan .................................. 6-255761
Oct. 20, 1994 [JP] Japan .................................. 6-255786

[51] Int. Cl.$^6$ .................................................. C02F 1/461
[52] U.S. Cl. ........................... 204/228; 204/229; 204/275
[58] Field of Search ................................. 204/228, 229, 204/275

[56] References Cited

U.S. PATENT DOCUMENTS 5,306,409  4/1994  Arai ........................................ 204/229

Primary Examiner—Arun S. Phasge
Attorney, Agent, or Firm—Hazel & Thomas, P.C.

[57] ABSTRACT

A production system of electrolyzed water which includes a first brine tank arranged to store an amount of saturated brine, a second brine tank arranged to store an amount of diluted brine prepared by dilution of the saturated brine supplied from the first brine tank and an electrolyzer for electrolyzing the diluted brine supplied from the second brine tank. In the production system, an electric controller is adapted to maintain the level and concentration of diluted brine in the second brine tank and to correct the concentration of the diluted brine in accordance with a temperature of the diluted brine or pH of electrolyzed water produced in the electrolyzer.

3 Claims, 8 Drawing Sheets

| CONCENTRATION "C" OF DILUTED BRINE / LEVEL "h" OF DILUTED BRINE IN TANK 20 | "h" > LOWER LIMIT | LOWER LIMIT ≦ "h" < UPPER LIMIT | "h" ≧ UPPER LIMIT |
|---|---|---|---|
| $C < C_0 - \Delta C$ | CONDITION 301<br>OPEN "W"<br>OPEN "P" | CONDITION 302<br>- "W"<br>OPEN "P" | CONDITION 303<br>CLOSE "W"<br>OPEN "P" |
| $C_0 - \Delta C \leq C < C_0 + \Delta C$ | CONDITION 304<br>OPEN "W"<br>- "P" | CONDITION 305<br>- "W"<br>- "P" | CONDITION 306<br>CLOSE "W"<br>- "P" |
| $C \geq C_0 + \Delta C$ | CONDITION 307<br>OPEN "W"<br>CLOSE "P" | CONDITION 308<br>- "W"<br>CLOSE "P" | CONDITION 309<br>OPEN "W"<br>CLOSE "P" |

PRODUCTION SYSTEM OF ELECTROLYZED WATER

BACKGROUND OF THE INVENTION

1. Field of the Invention

The present invention relates to a production system for producing electrolyzed water by electrolysis of brine in an electrolyzer.

2. Description of the Prior Art

Figure 8:
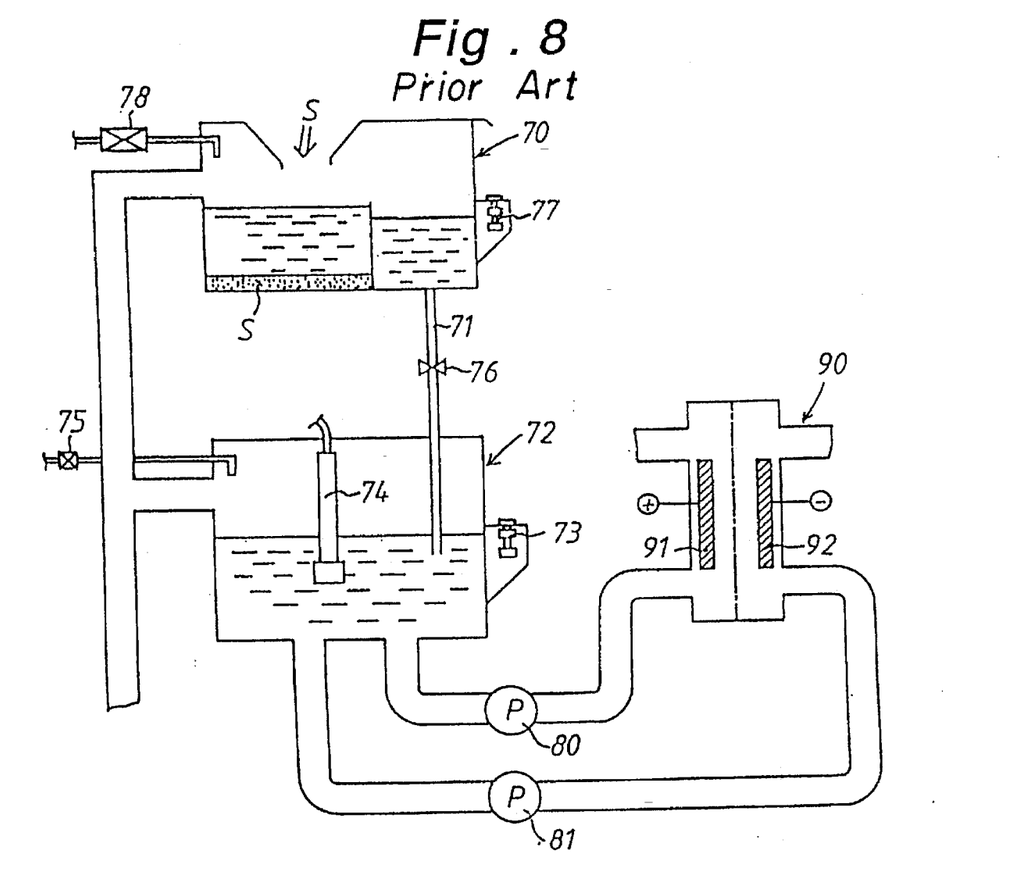
FIG. 8 is a schematic illustration of a conventional production system of electrolyzed water.

Illustrated in FIG. 8 is a conventional production system of electrolyzed water of the type which includes a saturated brine tank 70 arranged to store saturated brine prepared by dissolution of water-soluble salt S such as table salt, a diluted brine tank 72 arranged to store diluted brine prepared by dilution of the saturated brine supplied from the saturated brine tank 70 through a discharge conduit 71 and an electrolyzer 90 provided therein with an anode 91 and a cathode 92 for electrolyzing the diluted brine supplied from the diluted brine tank 72 by means of hydraulic pumps 80 and 81 for production of acidic water and alkaline water. In the production system of electrolyzed water, the level of diluted brine in tank 72 drops due to continuous supply of the diluted brine into the electrolyzer 90. Thus, the production system is provided with a liquid surface sensor 73 for detecting the level of diluted brine in tank 72, a density sensor 74 for detecting concentration of the diluted brine and an electronic controller (not shown) responsive to electric signals from the sensors 73 and 74 for controlling each operation of a water supply valve 75 and a pinch valve 76 in such a manner that the level and concentration of diluted brine in tank 72 are maintained higher than a predetermined value. When the saturated brine is supplied into the diluted brine tank 72 from the saturated brine tank 70 to properly prepare the concentration of diluted brine in tank 72, the level of saturated brine in tank 70 drops. When the drop of the level of saturated brine in tank 70 is detected by a liquid surface sensor 77, the controller acts to open a water supply valve 78 in response to an electric signal from the liquid surface sensor 77 for supplying fresh water into the saturated brine tank 70 until the level of saturated brine rises up to a predetermined level.

In such a conventional production system of electrolyzed water as described above, however, the temperature of brine, the hardness of water or the DC voltage applied to the electrolyzer fluctuates due to change of the season or environments. This results in change of the efficiency of electrolysis in the electrolyzer 90. It is, therefore, difficult to constantly produce electrolyzed water with a desired chemical property.

SUMMARY OF THE INVENTION

A primary object of the present invention is to provide a production system capable of constantly producing electrolyzed water with a desired chemical property such as a sterilizing effect without any influence caused by change of the season or environments.

According to the present invention, the primary object is accomplished by providing a production system of electrolyzed water which comprises an electrolyzer; a brine tank arranged to store an amount of diluted brine to be supplied into the electrolyzer: first detection means for detecting the level of diluted brine in the brine tank and for producing an electric signal indicative of the detected level of diluted brine; water supply means for supplying fresh water into the brine tank from an external source of water; first control means for controlling the water supply means in response to the electric signal from the first detection means in such a manner that the level of diluted brine is maintained in a predetermined level; second detection means for detecting concentration of diluted brine in the brine tank: saturated brine supply means for supplying saturated brine into the brine tank; comparison means for comparing concentration of the diluted brine detected by the second detection means with a reference concentration; and second control means for controlling the saturated brine supply means in such a manner that the saturated brine is supplied into the brine tank when the concentration of the diluted brine is lower than the reference concentration; wherein the production system further comprises temperature detection means for detecting a temperature of the diluted brine or electrolyzed water produced in the electrolyzer and for producing an electric signal indicative of the detected temperature; and correction means responsive to the electric signal from the temperature detection means for correcting the reference concentration or the concentration of the diluted brine detected by the second detection means so that electrolyzed water with a desired chemical property is constantly produced in the electrolyzer.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
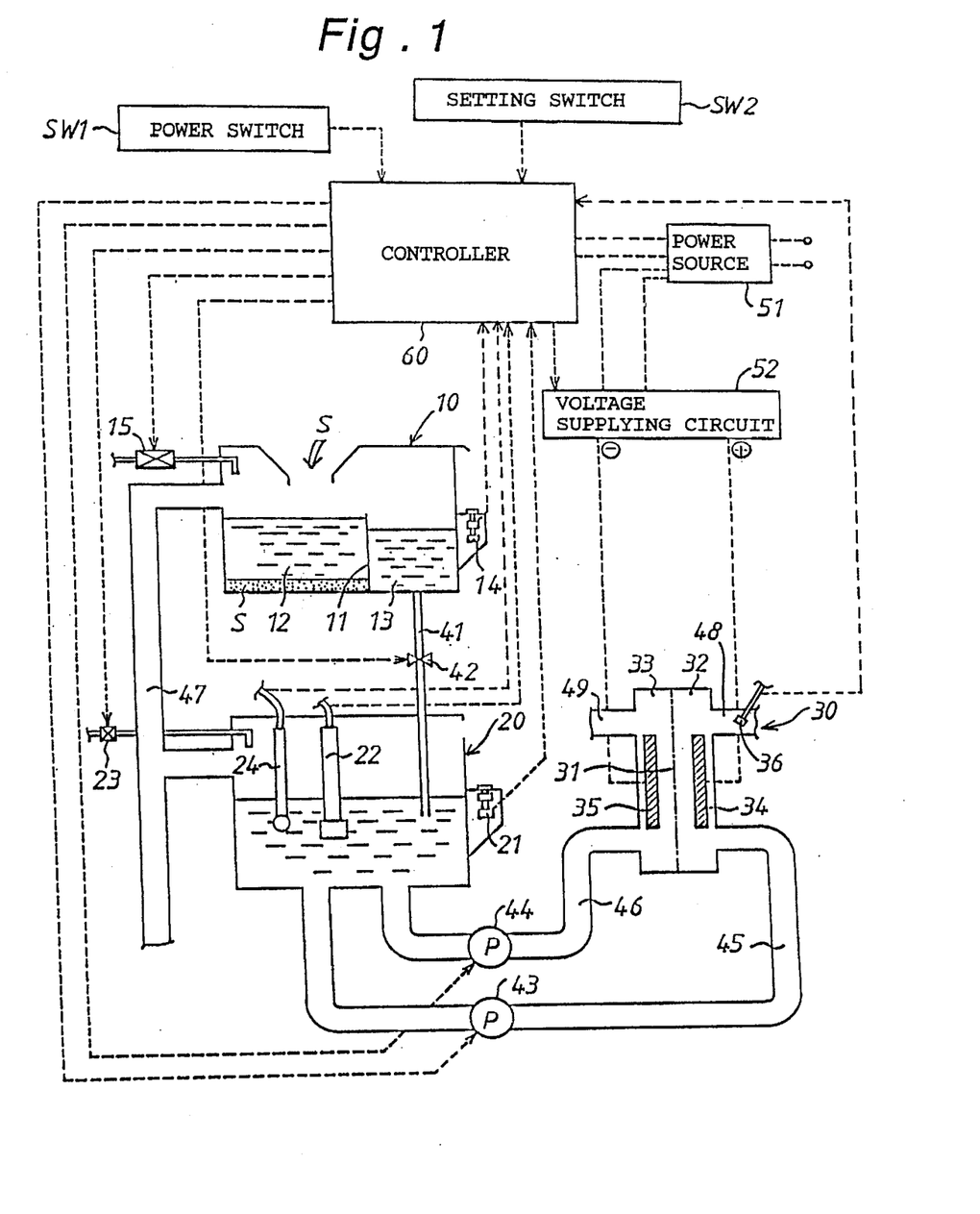
FIG. 1 is a schematic illustration of a production system of electrolyzed water in accordance with the present invention.

In FIG. 1 of the drawings, there is schematically illustrated a preferred embodiment of a production system of electrolyzed water in accordance with the present invention. The production system includes an upper brine tank 10 arranged to store saturated brine of about 26% concentration, a lower brine tank 20 arranged to store diluted brine of about 0.07% concentration prepared by dilution of the saturated brine supplied from the upper brine tank 10 through a discharge conduit 41 under control of an electrically operated pinch valve 42 and an electrolyzer 30 the interior of which is subdivided into an anode chamber 32 and a cathode chamber 33 by means of a cation permeable vertical membrane 31. The anode chamber 32 and cathode chamber 33 are connected to the lower brine tank 20 through conduits 45 and 46 respectively to be supplied with the diluted brine by means of hydraulic pumps 43 and 44. In the electrolyzer 30, the diluted brine from tank 20 is electrolyzed into acid water and alkaline water respectively In the anode chamber 32 and cathode chamber 33. The acid water is discharged from an outlet duct 48 of the anode chamber 32, while the alkaline water is discharged from an outlet duct 49 of the cathode chamber 33.

The upper brine tank 10 is subdivided into two compartments 12 and 13 by means of a partition wall 11. The first compartment 12 is supplied with an amount of table salt S and supplied with fresh water from an external source of water (not shown) under control of an electrically operated water supply valve 15. The second compartment 13 is filled with saturated brine supplied from the first compartment 12 over the partition wall 11. The second compartment 13 is provided with a float type liquid surface sensor 14 which is arranged to detect the fact that the level of saturated brine has dropped below a lower limit level or risen above an upper limit level. The saturated brine from tank 10 is supplied into the lower brine tank 20 through the discharge conduit 41 as described above. The lower brine tank 20 is provided with a float type liquid surface sensor 21 which is arranged to detect the fact that the level of diluted brine has dropped below a lower limit level or risen above an upper limit level, a density sensor 22 arranged to detect concentration of the diluted brine in tank 20 and a temperature sensor 24 arranged to detect a temperature of the diluted brine. The lower brine tank 20 is supplied with fresh water from the external source of water under control of an electrically operated water supply valve 23. In addition, an overflow pipe 47 is connected to the upper and lower brine tanks 10 and 20 to discharge an excessive amount of brine over a predetermined level.

The electrolyzer 30 includes an anode 34 and a cathode 35 respectively disposed within the anode chamber 32 and cathode chamber 33 and connected to a power source of DC current 51 through a voltage supplying circuit 52. The production system of electrolyzed water comprises an electronic controller 60 which is connected to a power source switch SW1, a setting switch SW2, the liquid surface sensors 14, 21, the density sensor 22 and the temperature sensor 24. The controller 60 is comprised of a microcomputer which is programmed to execute a control program shown by flow charts in FIGS. 2 and 3 for controlling each operation of the water supply valves 15, 23, pinch valve 42, hydraulic pumps 43, 44 and voltage supplying circuit 52.

Hereinafter, operation of the production system will be described with reference to the flow charts shown in FIGS. 2 and 3. Assuming that the power source switch SW1 has been turned on at step 100 of FIG. 2 to operate the production system of electrolyzed water, the controller 60 operates the water supply valves 15, 23 and pinch valve 42 at step 102 to store a predetermined amount of saturated brine in upper brine tank 10 and to store a predetermined amount of diluted brine in lower brine tank 20. In this instance, the controller 60 controls each operation of the water supply valves 15, 23 and pinch valve 42 in response to electric signals applied from the liquid surface sensors 14 and 21. When the upper and lower brine tanks 10 and 20 each are filled with the predetermined amount of brine, the controller 60 causes voltage supplying circuit 52 at step 104 to apply the DC voltage to the anode 34 and cathode 35 from the source 51 of DC current and activates the hydraulic pumps 43, 44 to supply the diluted brine into the electrolyzer 30. Thus, the diluted brine in electrolyzer 30 is electrolyzed to produce acid water in the anode chamber 32 and to produce alkaline water in the cathode chamber 33. After started to electrolyze the diluted brine supplied from the lower brine tank 20, the controller 60 repeatedly executes processing at step 106-118 of the program.

At step 106, the controller 60 controls operation of the water supply valve 15 in response to an electric signal from the liquid surface sensor 14 to supply fresh water into the upper brine tank 10 so that the level of saturated brine is maintained at a predetermined level. After processing at step 106, the controller 60 reads out a reference value of concentration (for instance, 0.07%) determined by the setting switch SW2 and causes the program to proceed to step 110 where the controller 60 reads out the temperature T of the diluted brine detected by the temperature sensor 24. At the following step 112, the controller 60 calculates a correction value $C_o'$ of concentration in relation to the detected temperature T of diluted brine on a basis of a correction table shown in FIG. 4. The correction table is designed to define the correction value $C_o'$ of concentration as "0" when the temperature T of diluted brine is 24° C. in a condition where the reference value $C_o$ of concentration is being set as 0.07%.

When the program proceeds to step 114, the controller 60 adds the calculated correction value $C_o'$ of concentration to the reference concentration $C_o$ to renew the reference concentration $C_o$ with a new reference value $C_o$ (=$C_o$+$C_o'$) of concentration. In case the temperature T of diluted brine is high, the correction value $C_o'$ of concentration is determined as a negative value so that the renewed reference concentration $C_o$ becomes smaller than the previous reference concentration $C_o$. In case the temperature T of diluted brine is low, the correction value $C_o'$ of concentration is determined as a positive value so that the renewed reference concentration $C_o$ becomes larger than the previous reference concentration $C_o$. Subsequently, the controller 60 reads out at step 116 the concentration C of diluted brine detected by the density sensor 22 and executes at step 118 a control routine for the water supply valve 23 and pinch valve 42 in response to electric signals applied from the density sensor 22 and liquid surface sensor 21.

Figure 2:
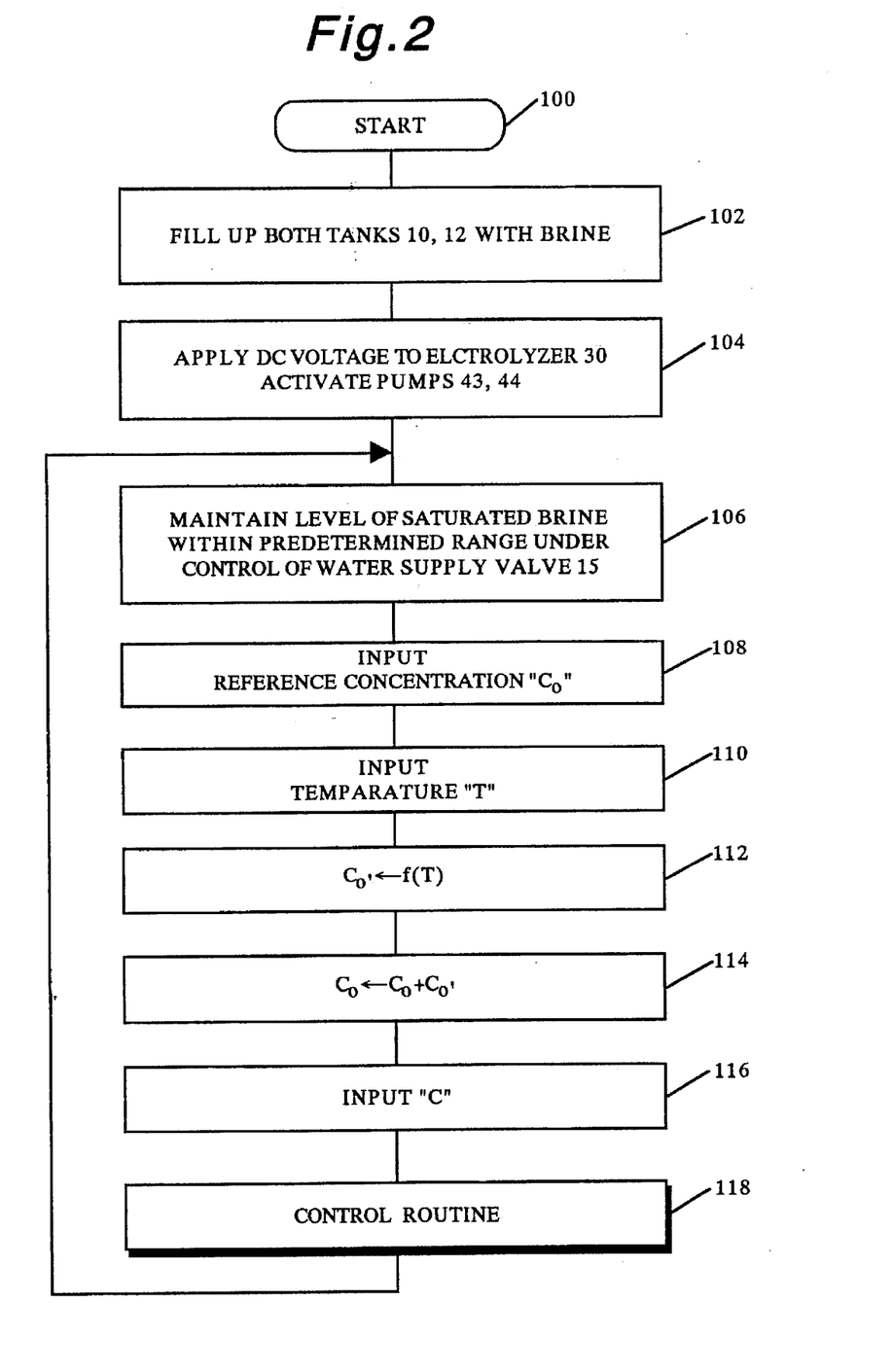
FIG. 2 is a flow chart of a control program executed by a controller shown in FIG. 1.
Figure 3:
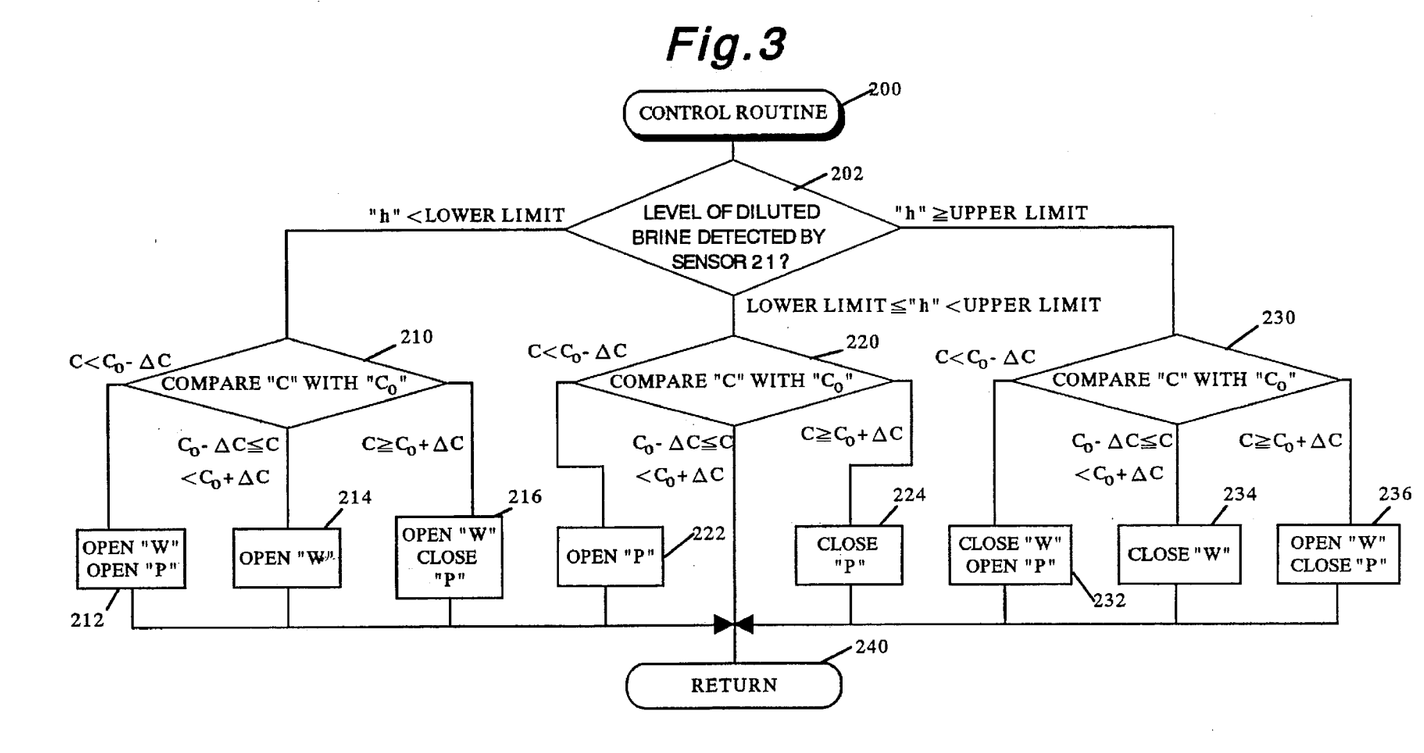
FIG. 3 is a flow chart of a control routine shown in FIG. 2.

As shown in FIG. 3, the controller 60 starts at step 200 to execute the control routine and determines at step 202 whether the level "h" of diluted brine detected by the liquid surface sensor 21 is in a predetermined range between upper and lower limit levels. When the level "h" of diluted brine is lower than the lower limit level, the controller 60 causes the program at step 202 to proceed to step 210. At step 210, the controller 60 compares the concentration C of diluted brine read out at step 116 with the reference concentration $C_o$ calculated at step 114 to determine whether the concentration C of diluted brine is in a range between lower and upper limits of a tolerance of the reference concentration $C_o$. Based on a result of determination at step 210, the controller 60 causes the program to proceed to step 212, 214 or 216. At step 212, 214 or 216, the controller 60 controls each operation of the water supply valve 23 and pinch valve 42 in a conditions 301, 304 or 307 shown by a table in FIG. 5. Thereafter, the controller 60 finishes execution of the control routine at step 240 and returns the program to step 106 shown in FIG. 2.

When the level "h" of diluted brine is in the predetermined range between the lower and upper limit levels, the controller 60 causes the program at step 202 to proceed to step 220. At step 220, the controller 60 compares the concentration C of diluted brine with the renewed reference concentration $C_o$ in the same manner as processing at step 210. When the concentration C of diluted brine is lower than the lower limit ($C_o$−ΔC) of the tolerance of the reference concentration $C_o$ or higher than the upper limit ($C_o+\Delta C$) of the tolerance, the program proceeds to step 222 or 224 where the controller 60 controls operation of the pinch valve 42 in a condition 302 or 308 shown in the table of FIG. 5. Thereafter, the controller 60 finishes execution of the control routine at step 240 and returns the program to step 106 shown in FIG. 2.

When the level "h" of diluted brine is higher than the upper limit level, the controller 60 causes the program at step 202 to proceed to step 230. At step 230, the controller 60 compares the concentration C of diluted brine with the renewed reference concentration $C_o$ in the same manner as processing at step 210. Based on a result of determination at step 230, the controller 60 causes the program to proceed to step 232, 234 or 236. At step 232, 234 or 236, the controller 60 controls each operation of the water supply valve 23 and pinch valve 42 in a condition 303, 306 or 309 shown in the table of FIG. 5. Thereafter, the controller 60 finishes execution of the control routine and returns the program to step 106 shown in FIG. 2.

As a result of execution of the control routine at step 118 shown in FIG. 2, the level of diluted brine in tank 20 is maintained in the predetermined range and the concentration of the diluted brine is adjusted in accordance with the correction value $C_o'$ of concentration.

Hereinafter, each operation of the water supply valve 23 and pinch valve 42 during execution of the control routine will be described with reference to FIGS. 3 and 5. When it is detected by the liquid surface sensor 21 that the level of diluted brine in tank 20 has lowered at step 102 due to supply of the diluted brine into the electrolyzer 30, the controller 60 operates the water supply valve 23 to supply fresh water into the lower brine tank 20. This decreases the concentration of diluted brine in tank 20. When the concentration C of diluted brine becomes lower than the lower limit of the tolerance of the reference concentration $C_o$ in a condition where the level "h" of diluted brine is still lower than the lower limit level, the controller 60 operates both the water supply valve 23 and pinch valve 42 at step 212 in the condition 301 shown in the table of FIG. 5 to supply fresh water into the lower brine tank 20 from the external source of water and to supply saturated brine into the lower brine tank 20 from the upper brine tank 10. When the concentration C of diluted brine becomes higher than the upper limit of the tolerance of the reference value $C_o$ of concentration in a condition where the level "h" of diluted brine is still lower than the lower limit level, the controller 60 opens the water supply valve 23 and closes the pinch valve 42 at step 216 in the condition 307 shown in the table of FIG. 5. Thus, the control condition of the water supply valve 23 and pinch valve 42 is shifted to the condition 307 from the condition 301 through the condition 304 in the table of FIG. 5.

When the level "h" of diluted brine rises over the upper limit level by supply of fresh water in the condition 307, the controller 60 causes the program at step 202 to proceed to step 230. If in this instance the concentration C of diluted brine is maintained higher than the upper limit of the tolerance of the reference value Co of concentration, the controller 60 causes the program to proceed to step 236. During processing at step 236, the water supply valve 23 is maintained in its open position in a condition where the level "h" of diluted brine is maintained higher than the upper limit level. As a result, an excessive amount of diluted brine is discharged from the lower brine tank 10 through the overflow pipe 47, and the concentration C of diluted brine in tank 20 is rapidly adjusted to the predetermined concentration.

When the level "h" of diluted brine rises over the upper limit level in a condition where the lower brine tank 20 is being supplied with fresh water and saturated brine since the concentration C of diluted brine is lower than the lower limit of the tolerance of the reference concentration $C_o$, the controller 60 closes only the water supply valve 23 in response to an electric signal from the liquid surface sensor 21. Thus, the control condition of the water supply valve 23 and pinch valve 42 is shifted to the condition 303 from the condition 301 through the condition 302 in the table of FIG. 5.

If the pinch valve 42 is maintained in its open position to continue supply of the saturated brine into the lower brine tank 20 in a condition where the water supply valve 23 is closed, the concentration C of diluted brine becomes more than the upper limit of the tolerance of the reference concentration $C_o$. If in this instance the level of diluted brine is maintained higher than the upper limit level, the control condition of the water supply valve 23 and pinch valve 42 is shifted to the condition 309. Under the condition 309, the water supply valve 23 is maintained in its open position in a condition where the level "h" of diluted brine is higher than the upper limit level. As a result, an excessive amount of diluted brine is discharged from the lower brine tank 20 through the overflow pipe 47, and the concentration C of diluted brine is rapidly adjusted to the predetermined concentration. When the level of diluted brine in tank 20 drops due to supply of the diluted brine into the electrolyzer 30 during execution of the control routine, the control condition of the water supply valve 23 and pinch valve 42 is shifted to the condition 301 or 304 from the condition 303 or 306.

Figure 5:
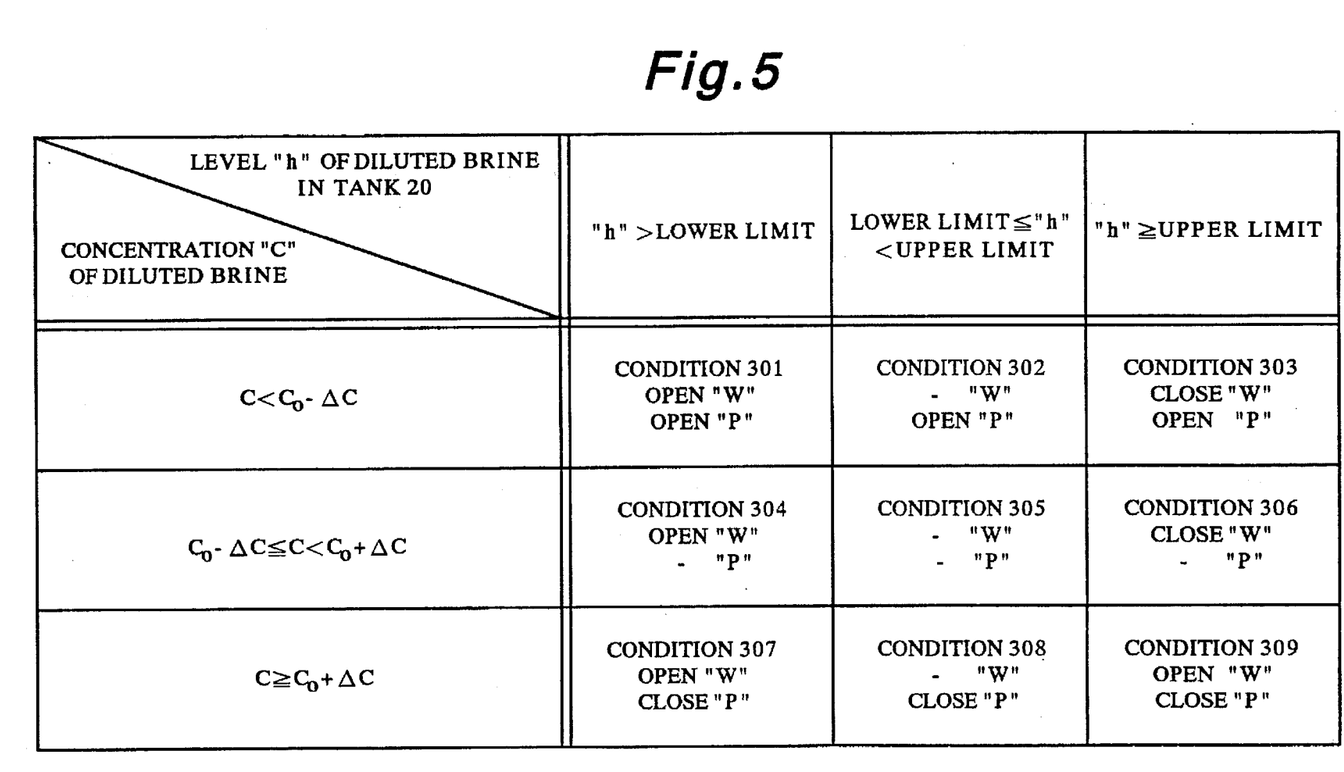
FIG. 5 is a table representing control conditions of a water supply valve and a pinch valve shown in FIG. 1.

As is understood from the above description, the control conditions shown in the table of FIG. 5 are shifted on a basis of a result of determination at step 202, 210 or 230. Under the condition 302, 305 or 308, the water supply valve 23 is maintained in its open position if it has been opened under the previous condition and is maintained in its closed position if it has been closed under the previous condition. Under the condition 304, 305 or 306, the pinch valve 42 is maintained in its open position if it has been opened under the previous condition and is maintained in its closed position if it has been closed under the previous condition.

Thus, the execution of the control routine is effective to maintain the level of diluted brine in tank 20 at the predetermined level between the upper and lower limit levels and to maintain the concentration C of diluted brine in the tolerance range ($C_o-\Delta C<C<C_o+\Delta C$) of the reference concentration $C_o$. During processing at step 108 to 116 of the control program, the reference concentration $C_o$ is renewed as a new reference value $C_o$ ($=C_o+C_o'$) by addition of the correction value $C_o'$ of concentration defined in relation to the temperature T to the reference concentration $C_o$ (0.07%) determined by the setting switch SW2. That is to say, when the temperature T of diluted brine is higher than 24° C., the reference concentration $C_o$ is renewed as a smaller value than the reference concentration $C_o$ (0.07%) defined by the setting switch SW2 since the correction value $C_o'$ is a negative value. When the temperature T of diluted brine is lower than 24° C., the reference concentration $C_o$ is renewed as a larger value than the reference concentration $C_o$ (0.07%) defined by the setting switch SW2 since the correction value $C_o'$ is a positive valve. Accordingly, when the temperature T of diluted brine is higher than 24° C., the concentration C of diluted brine is controlled on a basis of determination at step 210, 220 or 230 to be lower than the reference concentration $C_o$ previously defined by the setting switch SW2. When the temperature T of diluted brine is lower than 24° C., the concentration C of diluted brine is controlled on a basis of determination at step 210, 220 or 230 to be higher than the reference concentration Co previously defined by the setting switch SW2.

Thus, in the production system of electrolyzed water, the concentration C of diluted brine to be electrolyzed is adjusted in accordance with the temperature T of diluted brine even if the efficiency of electrolysis in the electrolyzer 30 is changed by the ambient temperature. It is, therefore, able to constantly produce electrolyzed water with a desired chemical property such as a sterilizing effect.

Figure 4:
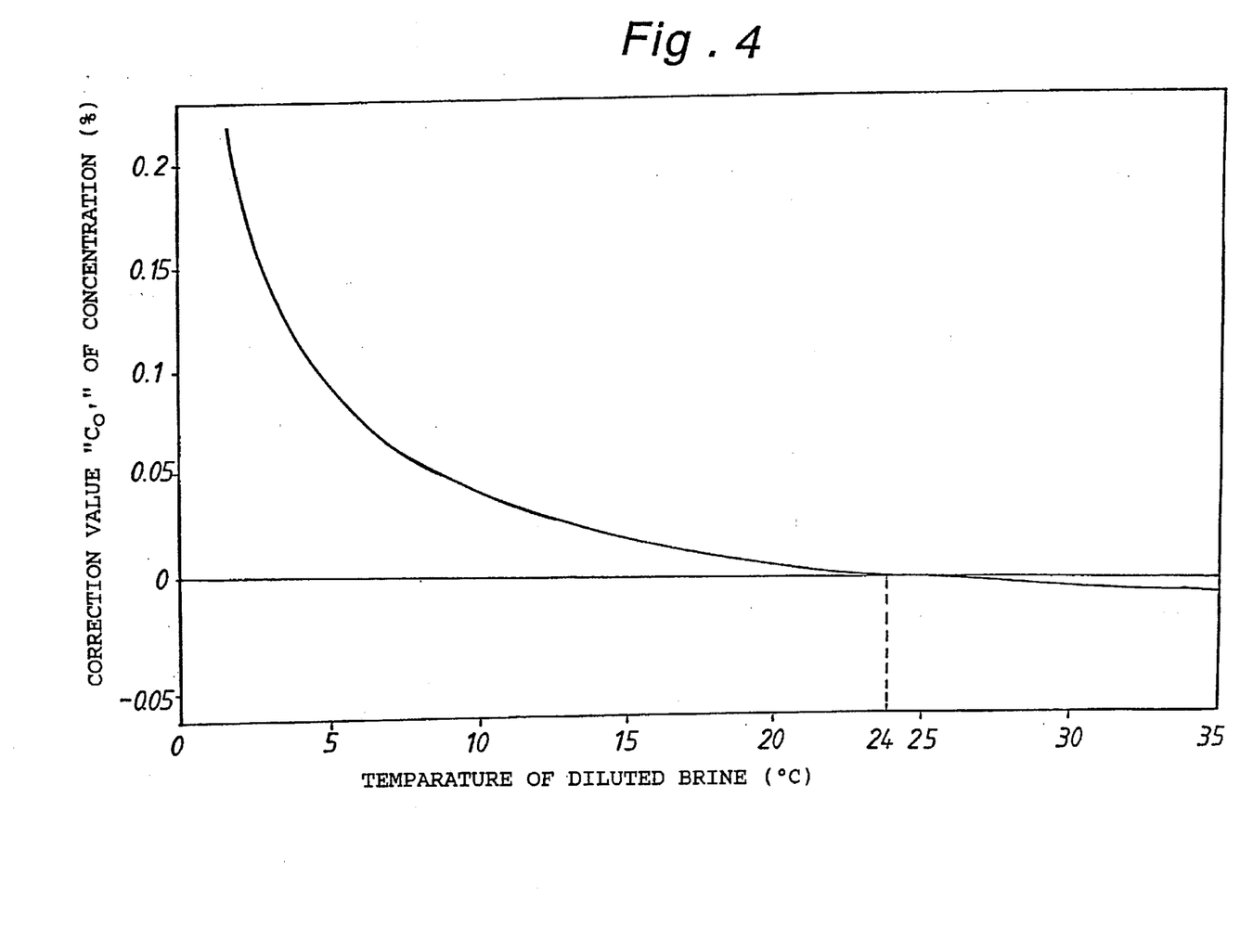
FIG. 4 is a graph showing a correction value of concentration of diluted brine in relation to a temperature of the diluted brine.

Although in the above embodiment the correction table of FIG. 4 is adapted to define the correction value $C_o'$ of concentration in relation to the temperature T of diluted brine, the correction value $C_o'$ may be calculated on a basis of a function related to the temperature T of diluted brine.

Figure 6:
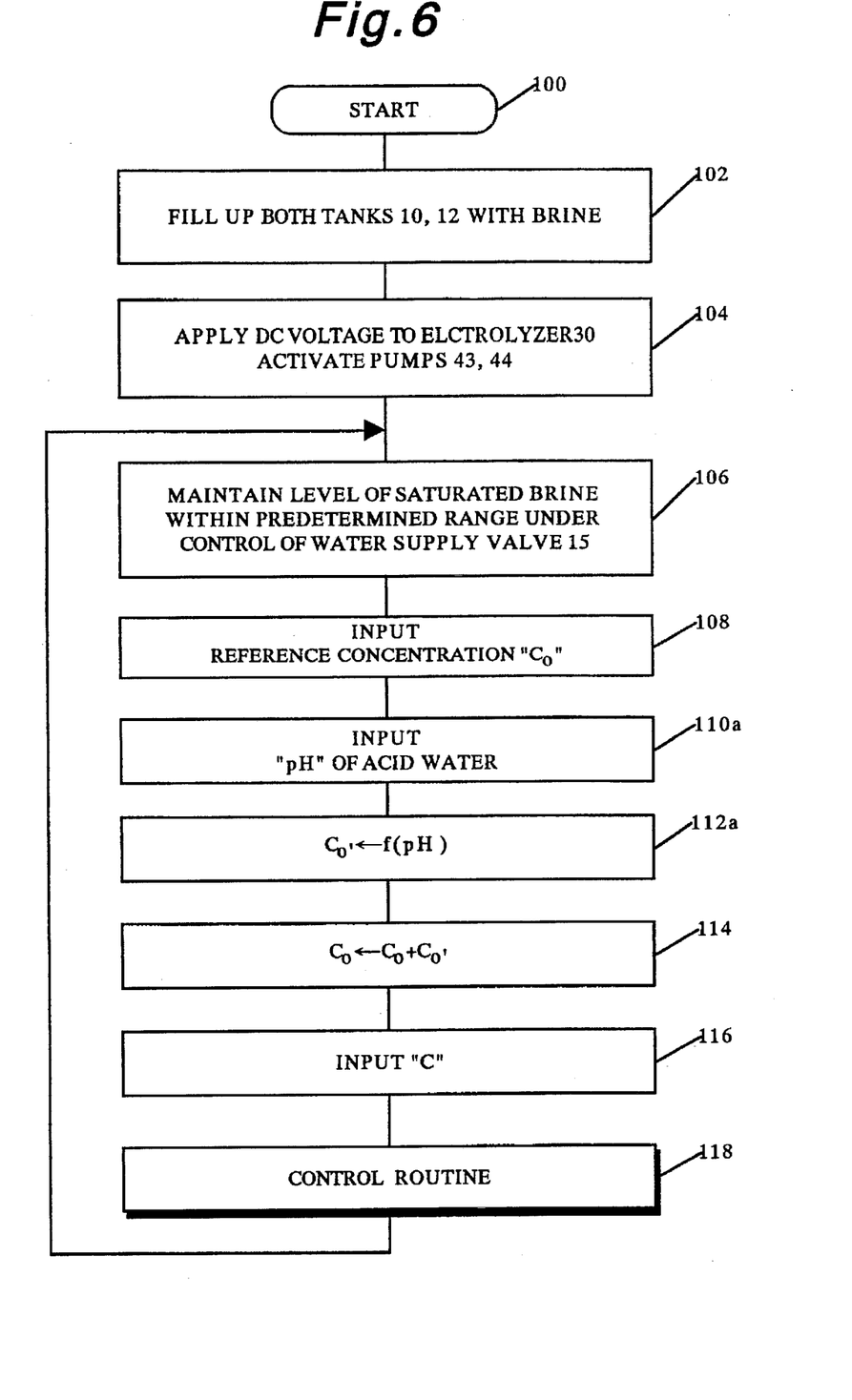
FIG. 6 is a flow chart of a modification of the control program executed by the controller shown in FIG. 1.
Figure 7:
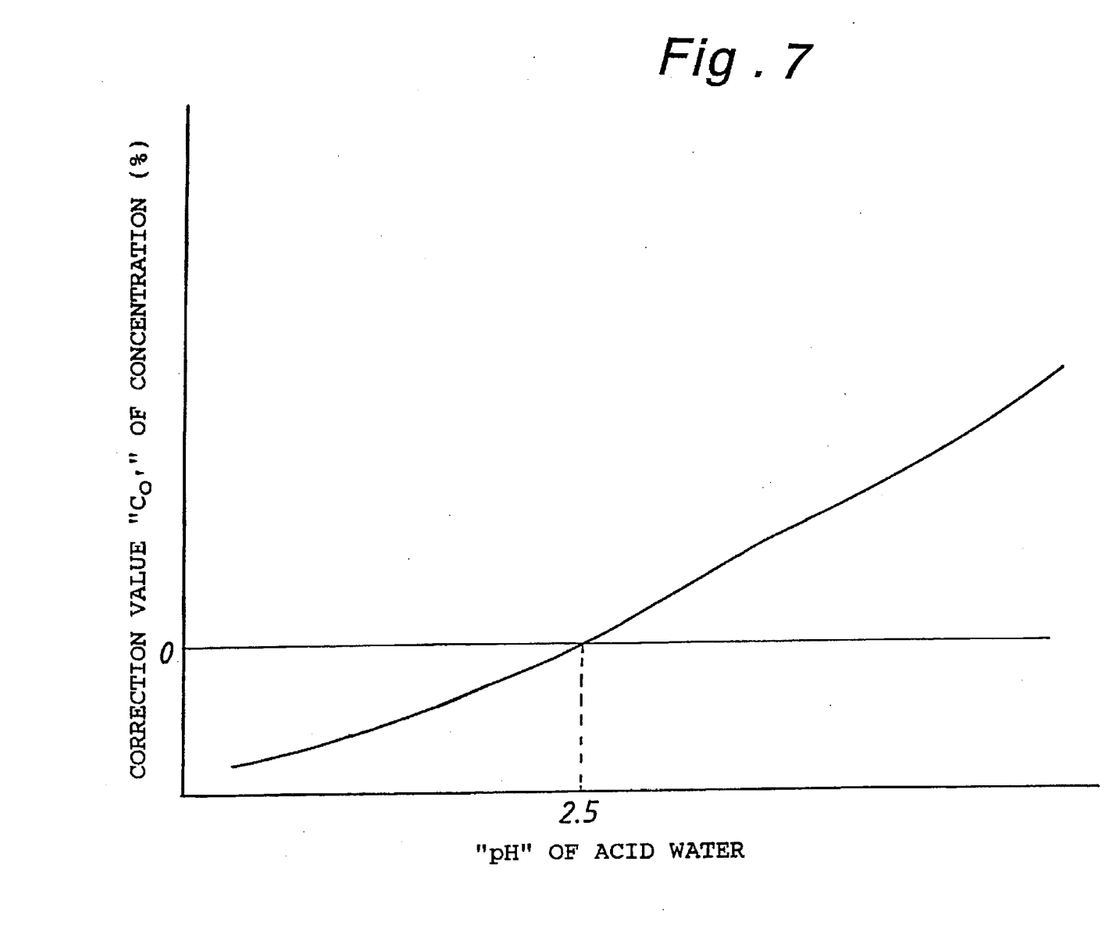
FIG. 7 is a graph showing a correction value of concentration of diluted brine in relation to pH of acid water.

In actual practices of the present invention, the temperature sensor 24 may be replaced with a pH sensor 36. As shown in FIG. 1, the pH sensor 36 is disposed within the outlet duct 48 of anode chamber 32 to measure pH of the acid water produced by electrolysis for applying an electric signal indicative of the measured pH to the controller 60. In such a modification of the present invention, the controller 60 is arranged to execute a control program shown by a flow chart in FIG. 6. The program of FIG. 6 is substantially the same as the program of FIG. 2 except for processing at step 110a and 112a. During execution of the program of FIG. 6, the controller 60 reads out pH of the acid water detected by the pH sensor 36 at step 110a and determines a correction value $C_o'$ of concentration in relation to the detected pH of the acid water on a basis of a correction table shown in FIG. 7. The correction table of FIG. 7 is designed to determine the correction value $C_o'$ of concentration as "0" when the detected pH is 2.5 in a condition where the reference concentration $C_o$ is being set as 0.07%. After processing at step 112a, the controller 60 adds the correction value $C_o'$ of concentration to the reference concentration $C_o$ to renew the reference concentration $C_o$ with a new reference value $C_o$ (=$C_o$+$C_o'$) of concentration. In case the pH of acid water is low, the correction value $C_o'$ is determined as a negative value so that the renewed reference concentration $C_o$ becomes smaller than the previous reference concentration $C_o$. In case the pH of acid water is high, the correction value $C_o'$ is determined as a positive value so that the renewed reference concentration $C_o$ becomes larger than the previous reference concentration $C_o$.

After processing at step 114, the controller 60 reads out at step 116 the concentration C of dilute brine detected by the density sensor 22 and executes at step 118 the control routine of FIG. 3 to maintain the level of diluted brine at the predetermined level between the lower and upper limit levels and to maintain the concentration $C_o$ of diluted brine within the tolerance range of the reference concentration $C_o$.

During processing at step 108 to 116 of the control program of FIG. 6, the reference concentration $C_o$ is renewed with a new reference value $C_o$ (=$C_o$+$C_o'$) by addition of the correction value $C_o'$ of concentration defined in relation to the pH of acid water to the reference concentration $C_o$ (0.07%) determined by the setting switch SW2. That is to say, when the pH of acid water is smaller than 2.5, the reference concentration $C_o$ is renewed with a smaller value than the reference concentration $C_o$ (0.07%) defined by the setting switch SW2 since the correction value $C_o'$ is a negative value. When the pH of acid water is larger than 2.8, the reference concentration $C_o$ is renewed with a larger value than the reference concentration $C_o$ (0.07%) defined by the setting switch SW2 since the correction value $C_o'$ is a positive value. Accordingly, when the pH of acid water is smaller than 2.5, the concentration C of diluted brine is controlled on a basis of determination at step 210, 220 or 230 to be lower than the reference concentration $C_o$ previously defined by the setting switch SW2. When the pH of acid water is larger than 2.5, the concentration C of diluted brine is controlled on a basis of determination at step 210, 220 or 230 to be higher than the reference concentration $C_o$ previously defined by the setting switch SW2.

Since in the production system of electrolyzed water, the concentration C of diluted brine to be electrolyzed is adjusted in accordance with the pH of acid water detected by the pH sensor 36 as described above, it is able to constantly produce electrolyzed water with a desired chemical property, regardlessly of change of the efficiency of electrolysis in the electrolyzer 30 caused by the ambient temperature, change of the hardness of water to be electrolyzed or fluctuation of the applied DC voltage.

Although in the production system of electrolyzed water, the pH sensor has been adapted to measure pH of the acid water as a physical variable for evaluating a result of electrolysis, the pH sensor may be replaced with a pH sensor for measuring pH of the alkaline water. Alternatively, as the physical variable, conductivity of the electrolyzed water, residual chlorine, oxidative reducing potential or dissolved oxygen may be detected instead of the pH of electrolyzed water. Although in the production system of electrolyzed water, the correction table of FIG. 7 has been adapted to determine the correction value $C_o'$ of concentration in relation to the pH of the acid water by processing at step 112a, the correction value $C_o'$ of concentration may be calculated on a basis of a function related to the pH of the acid water.

What is claimed is:

1. A production system of electrolyzed water, comprising:

an electrolyzer;

a brine tank arranged to store diluted brine to be supplied into said electrolyzer;

first detection means for detecting the level of diluted brine in said brine tank and for producing an electric signal indicative of the detected level of diluted brine;

water supply means for supplying fresh water into said brine tank from an external source of water;

first control means for controlling said water supply means in response to the electric signal from said first detection means in such a manner that the level of diluted brine is maintained in a selected level;

second detection means for detecting concentration of diluted brine in said brine tank;

saturated brine supply means for supplying saturated brine into said brine tank;

comparison means for comparing concentration of the diluted brine detected by said second detection means with a reference concentration; and second control means for controlling said saturated brine supply means in such a manner that the saturated brine is supplied into said brine tank when the concentration of the diluted brine is lower than the reference concentration;

wherein the production system further comprises:

temperature detection means for detecting a temperature of the diluted brine or electrolyzed water produced in said electrolyzer and for producing an electric signal indicative of the detected temperature; and correction means responsive to the electric signal from said temperature detection means for correcting the reference concentration or the concentration of the diluted brine detected by said second detection means so that electrolyzed water with a desired chemical property is constantly produced in said electrolyzer.

2. A production system of electrolyzed water, comprising:

an electrolyzer;

a brine tank arranged to store diluted brine to be supplied into said electrolyzer;

first detection means for detecting the level of diluted brine in said brine tank and for producing an electric signal indicative of the detected level of diluted brine;

water supply means for supplying fresh water into said brine tank from an external source of water;

first control means for controlling said water supply means in response to the electric signal from said first detection means in such a manner that the level of diluted brine is maintained in a selected range;

second detection means for detecting concentration of diluted brine in said brine tank;

saturated brine supply means for supplying saturated brine into said brine tank;

comparison means for comparing concentration of the diluted brine detected by said second detection means with a reference concentration; and second control means for controlling said saturated brine supply means in such a manner that the saturated brine is supplied into said brine tank when the concentration of the diluted brine is lower than the reference concentration;

wherein the production system further comprises:

third detection means for detecting a physical variable for evaluation of a result of electrolysis of the diluted brine in said electrolyzer and for producing an electric signal indicative of the detected physical variable; and correction means for correcting the reference concentration or the concentration of the diluted brine detected by said second detection means so that electrolyzed water with a desired chemical property is constantly produced in said electrolyzer.

3. A production system of electrolyzed water as claimed in claim 2, wherein said third detection means comprises a pH sensor for detecting pH of electrolyzed water produced in said electrolyzer.

* * * * *